United States Patent
Yoshida

(10) Patent No.: US 8,063,147 B2
(45) Date of Patent: Nov. 22, 2011

(54) TRANSMISSION BELT AND PROCESS FOR PRODUCING THE SAME

(75) Inventor: Yasuhiko Yoshida, Kobe (JP)

(73) Assignee: Bando Chemical Industries, Ltd. (JP)

( * ) Notice: Subject to any disclaimer, the term of this patent is extended or adjusted under 35 U.S.C. 154(b) by 355 days.

(21) Appl. No.: 12/513,221

(22) PCT Filed: Aug. 31, 2007

(86) PCT No.: PCT/JP2007/067059
§ 371 (c)(1),
(2), (4) Date: May 1, 2009

(87) PCT Pub. No.: WO2008/056482
PCT Pub. Date: May 15, 2008

(65) Prior Publication Data
US 2010/0069190 A1  Mar. 18, 2010

(30) Foreign Application Priority Data
Nov. 10, 2006  (JP) ................ 2006-305292

(51) Int. Cl.
| *C08F 8/00* | (2006.01) |
| *C08L 9/00* | (2006.01) |
| *C08L 23/04* | (2006.01) |
| *C08L 23/10* | (2006.01) |
| *C08K 5/00* | (2006.01) |

(52) U.S. Cl. ......... 525/191; 525/232; 525/240; 524/515
(58) Field of Classification Search ............. 525/191, 525/232, 240; 524/515
See application file for complete search history.

(56) References Cited

U.S. PATENT DOCUMENTS
2004/0127873 A1 * 7/2004 Varona et al. ............ 604/385.01
2004/0176540 A1   9/2004 Nishihara FOREIGN PATENT DOCUMENTS
| EP | 1186797 A2 | 3/2002 |
| JP | 07-337480 | 12/1995 |
| JP | 09-176402 | 7/1997 |
| WO | WO2008/016429 A2 | 2/2008 |

* cited by examiner

Primary Examiner — Nathan M Nutter
(74) Attorney, Agent, or Firm — Berliner & Associates

(57) ABSTRACT

An object is to provide a transmission belt which is restrained from being deteriorated in a high-temperature atmosphere, is excellent in softness in a low-temperature atmosphere, and is hardly worn away. To attain the object, the invention provides a transmission belt made of a rubber composition wherein the ratio by weight of a Ziegler-Natta catalyst type ethylene/α-olefin copolymer rubber, which is an ethylene/α-olefin copolymer rubber obtained by polymerization in the presence of a Ziegler-Natta catalyst, to a metallocene type ethylene/α-olefin copolymer rubber, which is an ethylene/α-olefin copolymer rubber obtained by polymerization in the presence of a metallocene catalyst, is from 50/50 to 90/10.

5 Claims, 2 Drawing Sheets

TRANSMISSION BELT AND PROCESS FOR PRODUCING THE SAME

TECHNICAL FIELD

The present invention relates to a transmission belt made of a rubber composition, and a process for producing the same.

BACKGROUND ART

As transmission belts, friction driving transmission belts such as a V belt and a V-ribbed belt, and other belts are known. These are widely used for automobiles, general industries, and others.

The transmission belts each have, for example, a rubber coat canvas for covering the surface, an adhesive rubber layer in which core lines such as filaments are embedded, and a compression rubber layer laminated on the adhesive rubber layer, and are each made mainly of a rubber composition.

In this sort of transmission belt, the following has widely been used hitherto as the rubber component of the rubber composition from the viewpoint of restraining a remarkable deterioration of the rubber in a high-temperature atmosphere and improving the softness of the rubber in a low-temperature atmosphere: natural rubber (NR), styrene/butadiene copolymer rubber (SBR), chloroprene rubber (CR), ethylene/α-olefin copolymer rubber, hydrogenated nitrile-butadiene rubber (H-NBR), alkylated chlorosulfonated polyethylene (ACSM), or the like.

In particular, ethylene/α-olefin copolymer rubber is relatively frequently used since the rubber is better in heat resistance and cold resistance than chloroprene rubber (for example, Patent Document 1).

However, conventional ethylene/α-olefin copolymer rubber is easily worn away; thus, the rubber has an aspect that the lifespan is shorter than that of chloroprene rubber. Furthermore, the transmission belt made of ethylene/α-olefin copolymer rubber has an aspect that the belt is lacking in softness in a driving test under a severe condition of a low temperature such as −40° C., and in other situations.

As described above, conventional transmission belts have problems that the belts are easily worn away and are not yet sufficient in softness in a low-temperature atmosphere.

Patent Document 1: JP-A-9-176402

DISCLOSURE OF THE INVENTION

Problems to be Solved by the Invention

Thus, in light of the problems in the prior art, an object of the invention is to provide a transmission belt which is restrained from being deteriorated in a high-temperature atmosphere, is excellent in softness in a low-temperature atmosphere, and is hardly worn away.

Means for Solving the Problems

In order to solve the problems, the invention provides a transmission belt including a rubber composition including a Ziegler-Natta catalyst type ethylene/α-olefin copolymer rubber, which is an ethylene/α-olefin copolymer rubber obtained by polymerization in the presence of a Ziegler-Natta catalyst, and a metallocene type ethylene/α-olefin copolymer rubber, which is an ethylene/α-olefin copolymer rubber obtained by polymerization in the presence of a metallocene catalyst, wherein the ratio by weight of the Ziegler-Natta catalyst type ethylene/α-olefin copolymer rubber to the metallocene type ethylene/α-olefin copolymer rubber is from 50/50 to 90/10.

Effect of the Invention

According to the invention, a transmission belt can be provided which is restrained from being deteriorated in a relatively-high-temperature atmosphere, is excellent in softness in a low-temperature atmosphere, and is hardly worn away.

DESCRIPTION OF REFERENCE NUMERALS

1: rubberized canvas layer, 2: core lines, 3: adhesive rubber layer, 4: ribs, 5: compression rubber layer, 6: short fibers, 11: trailing pulley, 12: driving pulley, 13: idler pulley 70 mm in diameter, 14: idler pulley 45 mm in diameter

BEST MODE FOR CARRYING OUT THE INVENTION

Figure 1:
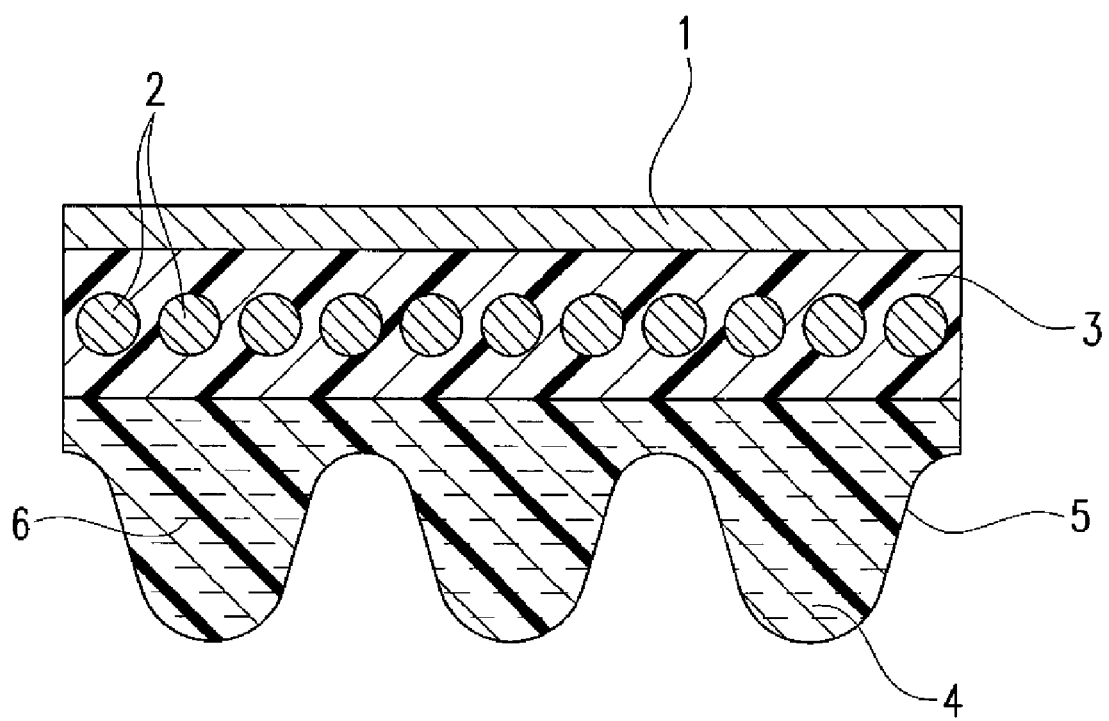
FIG. 1 is a schematic view of a transmission belt (V-ribbed belt) of the present embodiment when viewed in lateral cross section.

Hereinafter, an embodiment according to the invention will be described with reference to a schematic view of a V-ribbed belt of an embodiment of the present invention when viewed in lateral cross section in FIG. 1.

The V-ribbed belt of the embodiment of the invention is made in an endless belt form, and has a laminate structure wherein layers are laminated from the inside toward the outside. Specifically, the belt has a structure wherein the following layers are laminated: a compression rubber layer 5 which is innermostly arranged and is to be compressed onto a power transmission member such as a roller; an adhesive rubber layer 3 contacting the compression rubber layer 5; and a rubberized canvas layer 1 contacting the adhesive rubber layer 3. In the compression rubber layer 5, plural ribs 4 are formed in the width direction of the V-ribbed belt. In the adhesive rubber layer 3, core lines 2 are embedded in the state that the core lines 2 are arranged at regular intervals in the width direction of the V-ribbed belt and are extended in the longitudinal direction of the belt.

In the present embodiment, the compression rubber layer 5 is made of a predetermined rubber composition as described below.

The predetermined rubber composition constituting the compression rubber layer 5 in the embodiment contains a Ziegler-Natta catalyst type ethylene/α-olefin copolymer rubber, which is an ethylene/α-olefin copolymer rubber obtained by polymerization in the presence of a Ziegler-Natta catalyst, and a metallocene type ethylene/α-olefin copolymer rubber, which is an ethylene/α-olefin copolymer rubber obtained by polymerization in the presence of a metallocene catalyst, wherein the ratio by weight of the Ziegler-Natta catalyst type ethylene/α-olefin copolymer rubber to the metallocene type ethylene/α-olefin copolymer rubber is set within the range of 50/50 to 90/10.

The metallocene catalyst is also called a single site catalyst, and the use thereof makes it possible to make the molecular weight distribution of a polymer to be obtained narrower than the use of a multisite catalyst such as a Ziegler-Natta catalyst since the metallocene catalyst has uniform active sites.

Accordingly, about the metallocene type ethylene/α-olefin copolymer rubber, the molecular weight distribution thereof is narrow and the mobility of molecules thereof is restrained; thus, when the rubber is used alone, the rubber is restrained from being worn away. However, the metallocene type ethylene/α-olefin copolymer rubber has a problem of being poorer in polymer mobility under low-temperature conditions than Ziegler-Natta catalyst type ethylene/α-olefin copolymer rubbers.

However, in the embodiment, the ratio by weight of the above-mentioned

Ziegler-Natta catalyst type ethylene/α-olefin copolymer rubber to the metallocene type ethylene/α-olefin copolymer rubber is set within the range of 50/50 to 90/10. On the basis of this matter, the V-ribbed belt of the embodiment has an advantage that the above-mentioned problems can be overcome.

In the predetermined rubber composition constituting the compression rubber layer 5, as the Ziegler-Natta catalyst type ethylene/α-olefin copolymer rubber, the following may be used: ethylene/propylene copolymer rubber, ethylene/1-butene copolymer rubber, ethylene/1-octene copolymer rubber, copolymer rubbers further containing a diene component, and other rubbers, each of which is obtained by polymerization in the presence of a Ziegler-Natta catalyst.

Of these rubbers, preferred is ethylene/propylene/diene copolymer rubber obtained by polymerization in the presence of a Ziegler-Natta catalyst, and particularly preferred is the rubber wherein the individual monomer components are contained in such a manner that the weight proportion of the ethylene component is from 50 to 70% by weight, that of the propylene component is from 25 to 45% by weight, and that of the diene component is from 4 to 8% by weight.

Furthermore, in the predetermined rubber composition constituting the compression rubber layer 5, as the metallocene type ethylene/α-olefin copolymer rubber, the following may be used: ethylene/propylene copolymer rubber, ethylene/1-butene copolymer rubber, ethylene/1-octene copolymer rubber, copolymer rubbers further containing a diene component, and other rubbers, each of which is obtained by polymerization in the presence of a metallocene catalyst.

Of these rubbers, preferred is ethylene/propylene/diene copolymer rubber, and particularly preferred is the rubber wherein the individual monomer components are contained in such a manner that the weight proportion of the ethylene component is from 50 to 70% by weight, that of the propylene component is from 25 to 45% by weight, and that of the diene component is from 4 to 8% by weight.

In the embodiment, the compression rubber layer 5 has short fibers 6 oriented in the width direction of the V-ribbed belt so as to endure side pressure.

The short fibers 6 may be, for example, made of polyester fiber, polyvinyl alcohol fiber, polyamide fiber, cotton fiber, silk fiber, flax fiber, wool fiber, cellulose fiber, aromatic polyamide fiber, fully aromatic polyester fiber, poly(paraphenylene benzbisoxazole) fiber, carbon fiber, polyketone fiber, basalt fiber, or the like.

Furthermore, into the rubber composition constituting the compression rubber layer 5 are usually incorporated an additive, a softener, carbon black, a crosslinking agent, a vulcanization promoter, and others besides the short fibers 6.

The additive is preferably an additive containing polyethylene particles since the additive makes it possible to decrease the generation of abnormal sounds when the belt is driven.

The particles are, for example, polyethylene particles using a super-high molecular weight polyethylene having an average molecular weight of 500000 to 6000000, the molecular weight being measured by the viscosity method.

The additive is also preferably an additive made of particles the shape of which is kept even after the additive is added, and is preferably an additive having an average particle diameter of 10 μm to several hundreds of micrometers when the additive is used.

The softener may be a paraffin based softener, a naphthene based softener, or the like, and is preferably a softener containing, as a base thereof, a mineral oil having a good compatibility with the ethylene/α-olefin copolymer rubber and a relatively low polarity. The preferred softener is in particular preferably a softener having a pour point of −25° C. or lower since softness at low temperature can be given to the transmission belt.

The pour point can be measured by the method prescribed in JIS K 2269.

This softener may be a product (trade name: "DIANA (transliterated) PROCESS OIL PX-90", "DIANA PROCESS OIL PX-32", "DIANA PROCESS OIL NS-24" or "DIANA PROCESS OIL NS-100) commercially sold from Idemitsu Kosan Co., Ltd., a product (trade name: "SYNTACK (transliterated) N-60", or "SYNTACK N-70") commercially sold from Kobe Oil Chemical Industrial Co., Ltd., or a product (trade name: "LP-49", or "LP-69") commercially sold from Esso.

Carbon black described above is not particularly limited as far as it is generally used in rubber for transmission belts, and may be carbon black called furnace black, channel black, thermal black, acetylene black or the like.

The crosslinking agent may be sulfur, an organic peroxide, or the like. In the case of using sulfur as this crosslinking agent, it is preferred to use thiuram, sulfenamide, thiazole, a dithiocarbamate, and/or some other vulcanization promoter alone or in combination. The blend amount of the sulfur is from 0.5 to 3 parts by weight based on 100 parts by weight of the rubber component(s), and the total blend amount of the vulcanization promoter(s) is preferably from 0.5 to 5 parts by weight based on 100 parts by weight of the rubber component(s).

Blend-in-rubber chemicals used generally in the rubber industry, besides the above, may be incorporated into the rubber composition constituting the compression rubber layer 5 as far as the advantageous effects of the invention are not damaged. Examples of the chemicals, which can be incorporated, include fillers such as calcium carbonate and talc, a plasticizer, a stabilizer, a processing aid, and colorant.

The adhesive rubber layer 3 may be made of a rubber composition wherein any one or any ones selected from the following is/are used alone or in a mixture form: Ziegler-Natta catalyst type ethylene/α-olefin copolymer rubber and metallocene type ethylene/α-olefin copolymer rubber as used to form the compression rubber layer 5, natural rubber, chloroprene rubber, alkylchlorosulfonated polyethylene, acrylonitrile/butadiene copolymer rubber and hydrogenated products thereof, styrene/butadiene copolymer rubber, butadiene rubber, and others.

In the rubber composition constituting the adhesive rubber layer 3 in the embodiment, a reinforcing component may be used besides components as described above. Examples thereof include organic reinforcing agents, carbon black, silica, nylon short fiber, polyester short fiber, glass fiber, and ceramic fiber.

The use of, in particular, an organic reinforcing agent makes it possible to improve the adhesive force to the core lines so as to restrain the adhesive rubber layer 3 and the core lines 2 from being peeled from each other in the interface therebetween. As a result, the long-term durability of the V-ribbed belt can be made better.

Blend-in-rubber chemicals used generally in the rubber industry also, besides components as described above, may be incorporated into the rubber composition constituting the adhesive rubber layer 3 as far as the advantageous effects of the invention are not damaged. Examples of the chemicals include fillers such as calcium carbonate and talc, a plasticizer, a stabilizer, a processing aid, a colorant, a softener, a vulcanizing agent, a vulcanization aid, and a tackifier.

The core lines 2 embedded in the adhesive rubber layer 3 may be fibers made of a synthetic resin such as a polyester such as polyethylene terephthalate or polyethylene naphthalate, nylon, aramide or vinylon, glass fibers, steel cords, or the like. The core lines 2 may be subjected to resorcin/formalin/latex treatment (hereinafter, also referred to as "RFL treatment") or adhesive treatment with a solvent-type adhesive.

This RFL treatment may be conducted by use of an RFL treatment solution prepared, for example, by condensing resorcin and formalin with each other at a ratio by mole of 1/3 to 3/1 (resorcin/formalin) in the presence of a basic catalyst to produce a resorcin/formalin resin (resorcin/formalin initial condensate, which may be also referred to as "RF" hereinafter), dispersing the RF into water to give a concentration of 5 to 80% by weight, and then mixing the resultant with a latex.

The concentration of solids in the RFL treatment solution used in the RFL treatment of the core lines 2 is not particularly limited, and usually ranges from 10 to 30% by weight.

As the latex, any one or any ones selected from the following may be used alone or in a mixture form: latexes containing, as a polymer component, chlorosulfonated polyethylene or alkylchlorosulfonated polyethylene, latexes containing a pyridine group or carboxyl group, such as carboxyl-modified vinylpyridine latex and vinylpyridine latex, latexes containing a chlorine group, such as chloroprene (CR) latex and 2,3-dichlorobutadiene (2,3DCB) latex, latexes containing a nitrile group, such as acrylonitrile/butadiene copolymer (NBR) latex and carboxyl-group-containing hydrogenated NBR latex, and latexes having a phenyl group in its side chain, such as styrene/butadiene copolymer (SBR) latex. In short, the core lines may be subjected to RFL treatment plural times, using different RFL treatment solutions.

The RFL treatment solution(s) preferably contain(s) RF and a latex in such a manner that the ratio by weight of RF to the latex (RF/the latex) is from 1/2 to 1/10.

When the core lines 2 are subjected to the adhesive treatment with a solvent type adhesive, this adhesive may be generally a commercially available solvent type adhesive.

In the embodiment, the rubberized canvas layer 1 may be formed, using a single layer or plural layers of a rubber coated canvas used in ordinary transmission belts.

In the same manner as in the adhesive layer 3, in the rubber used in the rubber coated canvas, any one or any ones selected from the following may be used alone or in a mixture form: Ziegler-Natta catalyst type ethylene/α-olefin copolymer rubber, metallocene type ethylene/α-olefin copolymer rubber, natural rubber, chloroprene rubber, alkylchlorosulfonated polyethylene, acrylonitrile/butadiene copolymer rubber and hydrogenated products thereof, styrene/butadiene copolymer rubber, butadiene rubber, and others.

The transmission belt of the embodiment has a structure as described above; hereinafter, a process of an embodiment of the invention for producing the V-ribbed belt will be described.

The process of the embodiment of the invention for producing the V-ribbed belt is composed of a non-vulcanized rubber sheet producing step of producing a non-vulcanized rubber sheet for forming each of the rubberized canvas layer 1, the adhesive rubber layer 3, and the compression rubber layer 5 over a shaping drum, a winding step of winding the core lines 2 subjected to RFL treatment thereon, a vulcanizing step to be carried out after the winding step, a rib forming step to be carried out after the vulcanizing step, and a cutting step to be carried out after the rib forming step.

The non-vulcanized rubber sheet forming step is the step of using a kneader, a Banbury mixer or the like to knead each rubber composition according to a predetermined formulation, and then performing calendaring or the like to form each non-vulcanized rubber sheet.

The winding step is the step of wincing the non-vulcanized rubber sheet for forming the rubberized canvas layer 1 onto the circumferential face of a cylindrical shaping drum having a smooth surface, then winding the non-vulcanized rubber sheet for forming the adhesive rubber layer 3 thereon, then spinning the RFL-treated core lines 2 spirally thereon, then winding the non-vulcanized rubber sheet for forming the adhesive rubber layer 3 thereon, and then winding the non-vulcanized rubber sheet for forming the compression rubber layer 5 thereon, thereby forming a laminate.

About the RFL-treated core lines 2 used in the winding step, a method for the RFL treatment is carried out by immersing the core lines 2 into a toluene solution containing isocyanate at first, heating and drying the core lines at 200 to 250° C. for several tens of seconds, immersing the core lines into an RFL adhesive solution, thereafter heating the core lines at 190 to 210° C. for several tens of seconds, immersing the core lines into an adhesive solution wherein the same rubber as used in the rubber composition constituting the adhesive rubber layer is dissolved in a toluene solution, and then heating and drying the core lines at 50 to 80° C. for several tens of seconds.

The vulcanizing step is the step of heating and pressing the laminate in a vulcanizing can to integrate the individual laminated non-vulcanized rubber sheets into one body and further vulcanize the rubbers, thereby forming a ring-form product wherein a laminate structure is formed.

The heating temperature is usually set within the range of 150 to 180° C.

About the pressure applied into the vulcanizing can, usually, the internal pressure thereof is set within the range of 4 to 8 kgf/cm$^2$ and the external pressure thereof is set within the range of 7 to 10 kgf/cm$^2$.

The period for the vulcanizing treatment is usually set within the range of 20 to 60 minutes.

The rib forming step is the step of fitting the vulcanized ring-from product to a first driving system having a driving roll and a trailing roll, causing the roll to run with tensile force applied thereto, and forming plural ribs 4 in the surface of the ring-form product by means of a grinding wheel during the running.

The cutting step is the step of fitting the ring-form product, wherein the ribs 4 are formed in the surface, to a second driving system having a driving roll and a trailing roll, causing the roll to run with tensile force applied thereto, and cutting the ring-form product, during the running, into a state that the ribs 4 are extended into the longitudinal direction of the belt.

In the V-ribbed belt, the compression rubber layer is higher than the adhesive rubber layer and others in the possibility of being exposed to a high-temperature atmosphere by generated heats, such as frictional heat, and is more intensely required to have a good abrasion resistance. In light of the points, the above has described the present embodiment, giving, as an example, the case of using, in the formation of a compression rubber layer, a rubber composition containing a Ziegler-Natta catalyst type ethylene/α-olefin copolymer rub ber and a metallocene type ethylene/α-olefin copolymer rubber at a predetermined ratio by weight (the ratio of the Ziegler-Natta catalyst type ethylene/α-olefin copolymer rubber to the metallocene type ethylene/α-olefin copolymer rubber=50/50 to 90/10). However, cases where such a rubber composition is used not only in the compression rubber layer but also in an adhesive rubber layer, or one or more rubberized canvas layers for covering the front surface and/or the rear surface of a belt are also included within the scope intended by the present invention.

Furthermore, the present invention is not limited to V belts as described above, and the following cases are also included in the scope intended by the invention: cases using a rubber composition containing a Ziegler-Natta catalyst type ethylene/α-olefin copolymer rubber and a metallocene type ethylene/α-olefin copolymer rubber at a predetermined ratio in order to form a toothed belt, a flat belt or the like.

The transmission belt producing process is not limited to the above-mentioned example, either, and may be appropriately varied.

EXAMPLES

The invention will be more specifically described by way of examples hereinafter; however, the invention is not limited thereto.

Examples 1 to 10, and Comparative Examples 1 to 3

(Used Blend Components: Compression Rubber Layer)
In Table 1 are shown blend components (parts by weight) used to form compression rubber layers of transmission belts of Examples 1 to 10 and Comparative Examples 1 to 3.

The ratio by weight between individual monomer components of ethylene, propylene and diene contained in each of the above-mentioned metallocene type ethylene/propylene/diene copolymer rubbers and Ziegler-Natta catalyst type ethylene/propylene/diene copolymer rubbers is as shown in Table 2.

TABLE 2

| Maker name | Trade name | Ratio (%) by weight | | |
|---|---|---|---|---|
| | | Ethylene | Propylene | Diene |
| Dow Chemical Japan Ltd. | Nordel4640 | 55.0 | 40.1 | 4.9 |
| | Nordel4725 | 70.0 | 25.1 | 4.9 |
| | Nordel5565 | 50.0 | 42.5 | 7.5 |
| JSR Corp. | EP24 | 54.0 | 41.5 | 4.5 |
| | EP33 | 52.0 | 40.0 | 8.0 |
| | EP51 | 67.0 | 27.0 | 6.0 |

(Used Blend Components: Adhesive Rubber Layer)
In the productions of the transmission belts of all of Examples and Comparative Examples, rubber compositions constituting their adhesive rubber layers were made common to each other.

Specifically, a formulation shown in Table 3 was used.

TABLE 3

| Blended agents | Maker name | Trade name | Parts by weight |
|---|---|---|---|
| EPDM | Mitsui Chemicals, Inc. | MITSUI CHEMICAL 3085 (*1) | 100 |

TABLE 1

| | Comparative Example 1 | Comparative Example 2 | Example 1 | Example 2 | Example 3 | Comparative Example 3 | Example 4 | Example 5 | Example 6 | Example 7 | Example 8 | Example 9 | Example 10 |
|---|---|---|---|---|---|---|---|---|---|---|---|---|---|
| Nordel4640 (*1) | 100 | 60 | 50 | 40 | 10 | — | 40 | 40 | 40 | 40 | 40 | — | — |
| Nordel4725 (*2) | — | — | — | — | — | — | — | — | — | — | — | 40 | — |
| Nordel5565 (*3) | — | — | — | — | — | — | — | — | — | — | — | — | 40 |
| EP24 (*4) | — | 40 | 50 | 60 | 90 | 100 | 60 | 60 | 60 | — | — | — | — |
| EP33 (*5) | — | — | — | — | — | — | — | — | — | 60 | — | 60 | — |
| EP51 (*6) | — | — | — | — | — | — | — | — | — | — | 60 | — | 60 |
| Carbon black (*7) | 65 | 65 | 65 | 65 | 65 | 65 | 65 | 65 | 65 | 65 | 65 | 65 | 65 |
| Process oil (*8) | 10 | 10 | 10 | 10 | 10 | 10 | — | — | — | — | — | 10 | 10 |
| Process oil (*9) | — | — | — | — | — | — | 10 | — | 10 | 10 | 10 | — | — |
| Additive (PE particles) (*10) | — | — | — | — | — | — | — | 10 | 10 | 10 | 10 | — | — |
| Stearic acid (*11) | 1 | 1 | 1 | 1 | 1 | 1 | 1 | 1 | 1 | 1 | 1 | 1 | 1 |
| Zinc oxide (*12) | 5 | 5 | 5 | 5 | 5 | 5 | 5 | 5 | 5 | 5 | 5 | 5 | 5 |
| Sulfur (*13) | 1.5 | 1.5 | 1.5 | 1.5 | 1.5 | 1.5 | 1.5 | 1.5 | 1.5 | 1.5 | 1.5 | 1.5 | 1.5 |
| Vulcanization promoter (*14) | 1 | 1 | 1 | 1 | 1 | 1 | 1 | 1 | 1 | 1 | 1 | 1 | 1 |
| Nylon short fiber (*15) | 20 | 20 | 20 | 20 | 20 | 20 | 20 | 20 | 20 | 20 | 20 | 20 | 20 |

(*1) Metallocene type ethylene/propylene/diene copolymer rubber (trade name: "NORDEL 4640") manufactured by Dow Chemical Japan Ltd.
(*2) Metallocene type ethylene/propylene/diene copolymer rubber (trade name: "NORDEL 4725") manufactured by Dow Chemical Japan Ltd.
(*3) Metallocene type ethylene/propylene/diene copolymer rubber (trade name: "NORDEL 5565") manufactured by Dow Chemical Japan Ltd.
(*4) Ziegler-Natta catalyst type ethylene/propylene/diene copolymer rubber (trade name: "EP 24") manufactured by JSR Corp.
(*5) Ziegler-Natta catalyst type ethylene/propylene/diene copolymer rubber (trade name: "EP 33") manufactured by JSR Corp.
(*6) Ziegler-Natta catalyst type ethylene/propylene/diene copolymer rubber (trade name: "EP 51") manufactured by JSR Corp.
(*7) Trade name: "SHEEST (transliterated) 3" manufactured by Tokai Carbon Co., Ltd.
(*8) Paraffin based process oil (trade name: "SUNPER (transliterated) 2280") (pour point: −17.5° C.) manufactured by Japan Sun Oil Co., Ltd.
(*9) Paraffin based process oil (trade name: "DIANA (transliterated) PROCESS OIL PX-90") (pour point: −45° C.) manufactured by Idemitsu Petrochemical Co., Ltd.
(*10) Superhigh molecular weight polyethylene particles (trade name: "HIGH ZEX MILLION (transliterated) 240S) manufactured by Mitsui Chemicals, Inc. (average particle diameter 120 μm)
(*11) Trade name: "BEADS STEARIC ACID TSUBAKI (transliterated)" manufactured by NOF Corp.
(*12) Trade name: "AENKA No. 1" manufactured by Sakai Chemical Industry Co., Ltd.
(*13) Trade name: "OIL SULFUR (transliterated)" manufactured by Tsurumi Chemical Industry Co., Ltd.
(*14) Trade name: "NOCKSELLAR (transliterated) TET" manufactured by Ouchi Shinko Chemical Industrial Co., Ltd.
(*15) "REONA (transliterated) 66, 3-mm cut-product" manufactured by Asahi Kasei Corp.

TABLE 3-continued

| Blended agents | Maker name | Trade name | Parts by weight |
|---|---|---|---|
| Carbon black | Showa Cabot Kabushiki Kaisha (transliterated) | IP600 | 50 |
| Silica | Tokuyama Corp. | TOKUSEEL (transliterated) Gu | 20 |
| Paraffin based process oil | Japan Sun Oil Co., Ltd. | SUNFPER (transliterated) 2280 | 20 |
| Dicumylperoxide (vulcanizing agent) | NOF Corp. | PERCUMYL (transliterated) D | 2.5 |
| Stearic acid (vulcanizing agent) | Kao Corp. | STEARIC ACID | 1 |
| Zinc oxide (vulcanization aid) | Sakai Chemical Industry Co., Ltd. | AENKA No. 1 | 5 |
| Petroleum resin (tackifier) | Nippon Zeon Co., Ltd. | QUINTON (transliterated) A-100 | 5 |
| Short fiber | — | Cotton powder | 2 |

(*1) an ethylene-propylene-diene copolymer rubber obtained by polymerizing in the presence of a Ziegler-Natta catalyst (Rubber Composition for the Rubberized Canvas layers)

The rubber composition used to the formation of the rubberized canvas layers was the same rubber composition as used in the adhesive rubber.

(Core Lines Embedded in the Adhesive Rubber layers)

In the productions of the transmission belts of all of Examples and Comparative Examples, core lines used to be embedded in the adhesive rubber layers were made common to each other.

Specifically, the core lines were as follows:

As untreated core lines, prepared were polyester cords (1000 deniers/2×3, final twisted threads: 9.5T/10·cm (Z), primarily twisted threads: 2.19T/10·cm (manufactured by Teijin Ltd.)).

First, for pre-treatment, the untreated core lines were immersed into a toluene solution containing isocyanate (isocyanate solid content by percentage: 20% by weight), and then heated at 240° C. for 40 seconds so as to be dried.

Next, the pre-treated core lines were immersed into an RFL adhesive solution described below, and then subjected to drying treatment by heating at 200° C. for 80 seconds. Furthermore, the core lines were immersed into an adhesive solution wherein the same rubber composition as used in the adhesive rubber layers was dissolved in a toluene solution, and then dried by heating at 60° C. for 40 seconds. In this way, the core lines were subjected to RFL treatment.

The used RFL adhesive solution was a solution obtained by mixing resorcin (7.31 parts by weight) and formalin (10.77 parts by weight, concentration: 37% by weight) with each other, stirring the mixture, adding thereto an aqueous solution of sodium hydroxide (solid content: 0.33 parts by weight), stirring the mixture, adding water thereto, ripening the resultant for 5 hours to prepare an aqueous RF solution of resorcin/formalin resin (resorcin/formalin initial condensate, RF) wherein the ratio of R/F was 0.5, adding to the RF solution a chlorosulfonated polyethylene rubber (CSM) latex (solid content by percentage: 40%) to give a ratio of RFIL of 0.25 (total latex solid content: 45.2 parts by weight), adding water thereto to adjust the solid content by percentage into 20%, stirring the solution, and further ripening the resultant for 12 hours.

(Evaluation of Physical Properties of the Vulcanized Rubbers)

In order to examine physical properties of the rubber composition used to form the compression rubber layer of the transmission belt of each of Examples and Comparative Examples after the composition was vulcanized, a vulcanized rubber sheet was produced in accordance with each formulation shown in Table 1.

Specifically, each of the rubber compositions was kneaded by means of a Banbury mixer, and then rolled through calendaring rolls into a sheet, so as to orient the short fibers in the width direction of the belt. In this way, a non-vulcanized rubber sheet was formed.

Furthermore, the non-vulcanized rubber sheet was heated at 160° C. for 30 minutes so as to be vulcanized thereby yielding a vulcanized rubber sheet.

(Physical Properties of the Vulcanized Rubber Sheets)

Each of the vulcanized rubber sheets was used to evaluate physical properties shown in Table 4.

About the hardness of the vulcanized rubber sheet, the (type A) durometer hardness was obtained according to JIS K 6253.

Furthermore, a tensile test of the vulcanized rubber sheet in the anti-calendar direction was made on the basis of JIS K 6251 to obtain the 100% modulus (M100), the tensile strength (Ts) and the fracture elongation (Elo).

These results are shown in Table 4.

TABLE 4

| | | Unit | Comparative Example 1 | Comparative Example 2 | Example 1 | Example 2 | Example 3 | Comparative Example 3 | Example 4 | Example 5 | Example 6 | Example 7 | Example 8 | Example 9 | Example 10 |
|---|---|---|---|---|---|---|---|---|---|---|---|---|---|---|---|
| Durometer hardness | | — | 85 | 85 | 85 | 85 | 85 | 85 | 84 | 86 | 86 | 86 | 86 | 87 | 86 |
| Tensile test | M100 | MPa | 8.0 | 7.8 | 7.6 | 7.4 | 7.4 | 7.4 | 7.2 | 7.4 | 7.4 | 7.4 | 7.4 | 8.5 | 8.3 |
| | Ts | MPa | 11.0 | 10.8 | 10.6 | 10.4 | 10.2 | 10.2 | 10.2 | 10.0 | 10.0 | 10.0 | 10.0 | 11.6 | 12.0 |
| | Elo | % | 250 | 250 | 250 | 240 | 240 | 240 | 240 | 230 | 230 | 230 | 230 | 260 | 270 |

(Productions of V-Ribbed Belts of Examples 1 to 10 and Comparative Examples 1 to 3)

V-ribbed belts of Examples 1 to 10 and Comparative Examples 1 to 3 were each produced, using the above-mentioned compositions for compression rubber layer, composition for adhesive rubber layer, and composition for rubberized canvas layer, and the above-mentioned RFL-treated core lines.

Specifically, the rubber composition for compression rubber layer, and the rubber composition for adhesive rubber layer were each kneaded by means of a Banbury mixer, and made into a sheet through calendaring rolls. In this way, a non-vulcanized sheet for adhesive rubber layer and a non-vulcanized sheet for compression rubber layer were formed. The non-vulcanized rubber sheet for adhesive rubber layer was wound onto a sheet for rubberized canvas layer wound and set onto a cylindrical shaping drum having a smooth surface. The RFL-treated core lines were spirally spun thereon. Furthermore, the non-vulcanized rubber sheet for adhesive rubber layer was wound thereon. At last, the non-vulcanized rubber sheet for compression rubber layer was wound thereon, so as to yield a laminate.

Next, the laminate was heated and pressed in a vulcanizing can heated to 165° C. at the internal pressure thereof of 6 kgf/cm² and the external pressure of 9 kgf/cm², respectively, for 35 minutes, so as to yield a vulcanized ring-form product wherein the layers were integrated into one body.

The ring-form product was fitted to a first driving system having a driving roll and a trailing roll, and caused to run under a predetermined tensile force. During the running, plural ribs were formed in the surface of the ring-form product by means of a grinding wheel. Furthermore, the ring-form product was fitted to a second driving system having a driving roll and a trailing roll, and caused to run under tensile force. During the running, the product was cut into a state that the ribs were extended in the longitudinal direction of the belt, so as to yield each V-ribbed belt wherein the number of the ribs was 3 and the circumferential length was 1000 mm.

(Driving Test of the V-ribbed Belts)

Each of the V-ribbed belts yielded according to the production method was supplied, and a driving test described below was made.

Figure 2:
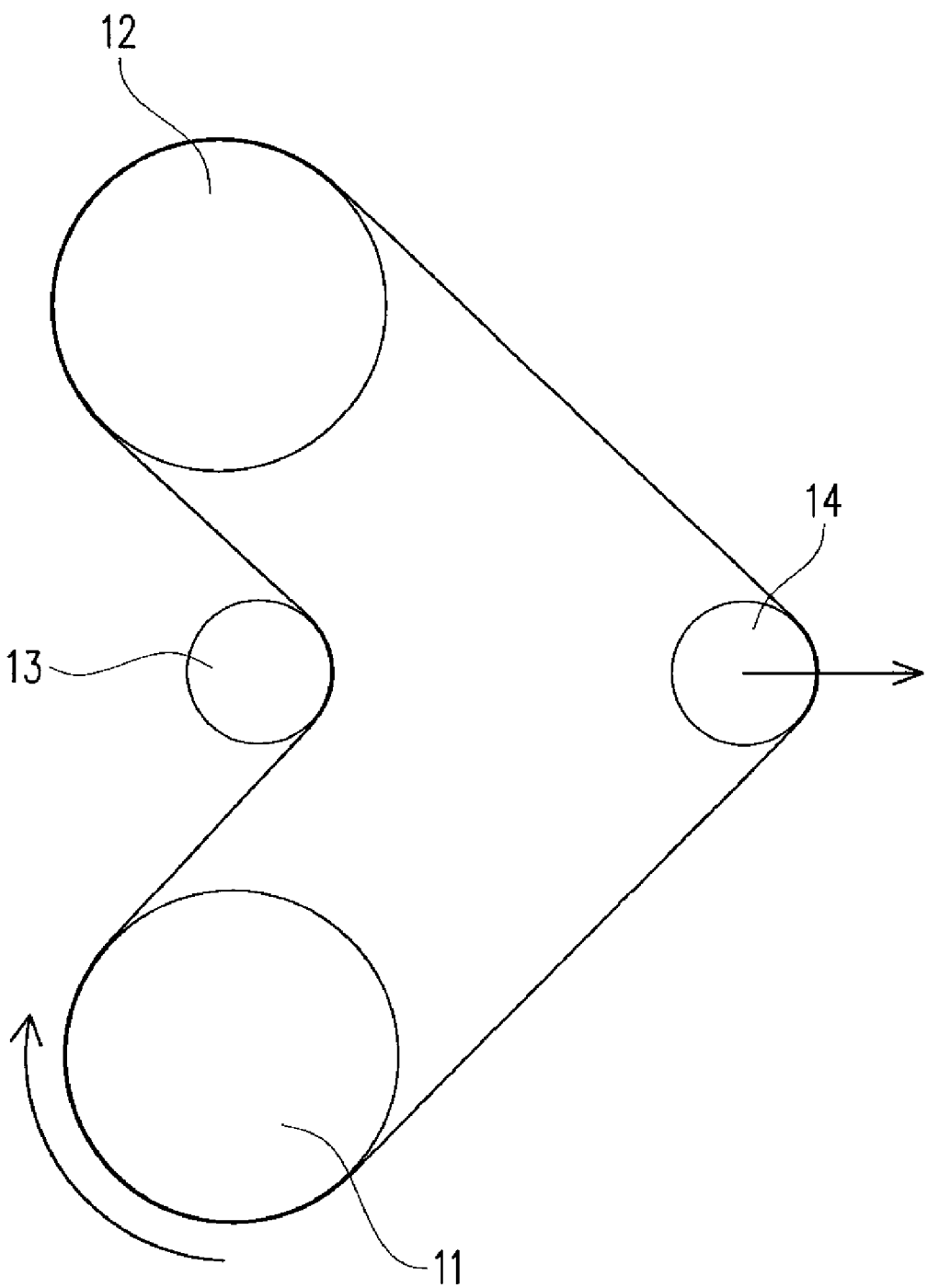
FIG. 2 is a schematic view illustrating a belt driving test method.

A schematic view in order to describe the driving test of the V-ribbed belt is shown in FIG. 2.

In the V-ribbed belt driving test, the V-ribbed belt was driven as follows: the belt was wound and stretched on a trailing pulley 1) of 120 mm diameter, a driving pulley 12 of 120 mm diameter, an idler pulley 13 of 70 mm diameter, and an idler pulley 14 of 45 mm diameter, the load onto the trailing pulley was set to 16 horsepowers, the tensile force to the idler puller 14 was set to 85 kgf, and the rotation number of the driving pulley was set to 4900 rpm.

(High-Temperature Driving Test)

(V-Ribbed Belt Abrasion Resistance)

Under the above-mentioned driving conditions, each of the V-ribbed belts was driven in an atmosphere at a temperature of 80° C. for 200 hours, and then the weight of the V-ribbed belt after the driving was subtracted from that of the belt before the driving to obtain a reduction in the weight. This reduction in the weight was divided by the weight before the driving to obtain the abrasion ratio (%) of the V-ribbed belt. The results are shown in Table 5.

(Abnormal Sound Property of the V-Ribbed Belts)

Under the above-mentioned driving conditions, each of the V-ribbed belts was driven for 200 hours, and then it was checked whether or not an abnormal sound was generated from the V-ribbed belt. The results are shown in Table 5.

(Low-temperature Driving Test)

(Deterioration of V-ribbed Belt)

A driving test of each of the V-ribbed belts was made in the same way as in the V-ribbed belt abrasion property evaluation except that the used driving test machine was driven in an atmosphere of −40° C. temperature, and further a set in which the V-ribbed belt was driven for 1 hour and then stopped for 1 hour was repeated to make the driving test.

When the total driving period (totalized period of only individual driving times) became 100 hours and 200 hours, respectively, it was checked with the naked eye whether or not the compression rubber region of the V-ribbed belt was cracked. The results are shown in Table 5.

(Overall Evaluation)

Out of the belts, a belt wherein the abrasion ratio was low in the high-temperature driving test and no crack was generated after 100 hours elapsed in the low-temperature driving test was judged as "◯ (good)".

A belt wherein the abrasion ratio was particularly low in the high-temperature driving test, no crack was generated after 200 hours elapsed in the low-temperature driving test, and further no abnormal sound was generated was judged as "⊙ (very good)".

A belt wherein the abrasion ratio was high in the high-temperature driving test or a crack was generated after 100 hours elapsed in the low-temperature driving test was judged as "× (bad)".

The results are shown in Table 5.

TABLE 5

|  | High-temperature driving test | | Low-temperature driving test | | |
| --- | --- | --- | --- | --- | --- |
|  | Abrasion ratio (%) | Abnormal sound | Crack after the driving for 100 hours | Crack after the driving for 200 hours | Overall evaluation |
| Comparative Example 1 | 1.4 | Generated | Generated | — | X |
| Comparative Example 2 | 1.6 | Generated | Generated | — | X |
| Example 1 | 1.8 | Generated | Not generated | Generated | ◯ |
| Example 2 | 2 | Generated | Not generated | Generated | ◯ |
| Example 3 | 2.5 | Generated | Not generated | Not generated | ◯ |
| Comparative Example 3 | 2.8 | Generated | Not generated | Not generated | X |
| Example 4 | 2 | Generated | Not generated | Not generated | ◯ |
| Example 5 | 2 | Not generated | Not generated | Not generated | ◯ |
| Example 6 | 2 | Not generated | Not generated | Not generated | ⊙ |
| Example 7 | 2 | Not generated | Not generated | Not generated | ⊙ |
| Example 8 | 2 | Not generated | Not generated | Not generated | ⊙ |
| Example 9 | 2.1 | Generated | Not generated | Generated | ◯ |
| Example 10 | 2.2 | Generated | Not generated | Generated | ◯ |

It has been ascertained that: about V-ribbed belts having a compression rubber layer made of a rubber composition wherein the ratio by weight of a Ziegler-Natta catalyst type ethylene/α-olefin copolymer rubber to a metallocene type ethylene/α-olefin copolymer rubber is from 50/50 to 90/10, the abrasion ratio is low in the high-temperature driving test of 80° C. temperature so that the belts have a nature that the belts do not wear easily; and a crack is not easily generated in the driving test in the low-temperature atmosphere so that the belts have softness under the low temperature condition.

It has been ascertained that: about V-ribbed belts having a compression rubber layer made of a rubber composition wherein the ratio by weight of a Ziegler-Natta catalyst type ethylene/α-olefin copolymer rubber to a metallocene type ethylene/α-olefin copolymer rubber is from 60/40 and further an additive and a softener are contained, the abrasion ratio is low in the long-period driving test so that the belts have a nature that the belts do not wear easily; and a crack is not easily generated in the driving test in the low-temperature atmosphere so that the belts have softness under the low temperature condition. It has also been ascertained that about belts further containing polyethylene particles as the additive, an abnormal sound is not easily generated.

The invention claimed is:

1. A transmission belt, comprising a rubber composition comprising a Ziegler-Natta catalyst type ethylene/propylene/diene copolymer rubber, which is an ethylene/propylene/diene copolymer rubber obtained by polymerization in the presence of a Ziegler-Natta catalyst, the ethylene/propylene/diene copolymer rubber containing individual monomer components so that a weight proportion of an ethylene component is from 50 to 70% by weight, that of a propylene component is from 25 to 45% by weight, and that of a diene component is from 4 to 8% by weight, and a metallocene type ethylene/propylene/diene copolymer rubber, which is an ethylene/propylene/diene copolymer rubber obtained by polymerization in the presence of a metallocene catalyst, the ethylene/propylene/diene copolymer rubber containing individual monomer components so that a weight proportion of an ethylene component is from 50 to 70% by weight, that of a propylene component is from 25 to 45% by weight, and that of a diene component is from 4 to 8% by weight, wherein the ratio by weight of the Ziegler-Natta catalyst type ethylene/propylene/diene copolymer rubber to the metallocene type ethylene/propylene/diene copolymer rubber is from 50/50 to 90/10.

2. The transmission belt according to claim 1, wherein the rubber composition contains an additive, and polyethylene resin particles are used as the additive.

3. The transmission belt according to claim 1, wherein the rubber composition contains a softener, a paraffin based softener or a naphthene based softener is used as the softener, and the pour point of the softener is −25° C. or lower.

4. The transmission belt according to claim 1, which is a V-ribbed belt.

5. A process for producing a transmission belt, wherein the belt is molded, using a rubber composition comprising a Ziegler-Natta catalyst type ethylene/propylene/diene copolymer rubber, which is an ethylen/propylene/diene copolymer rubber obtained by polymerization in the presence of a Ziegler-Natta catalyst, the ethylene/propylene/diene copolymer rubber containing individual monomer components so that a weight proportion of an ethylene component is from 50 to 70% by weight, that of a propylene component is from 25 to 45% by weight, and that of a diene component is from 4 to 8% by weight, and a metallocene type ethylene/propylene/diene copolymer rubber, which is an ethylene/propylene/diene copolymer rubber obtained by polymerization in the presence of a metallocene catalyst, the ethylene/propylene/diene copolymer rubber containing individual monomer components so that a weight proportion of an ethylene component is from 50 to 70% by weight, that of a propylene component is from 25 to 45% by weight, and that of a diene component is from 4 to 8% by weight, wherein the ratio by weight of the Ziegler-Natta catalyst type ethylene/propylene/diene copolymer rubber to the metallocene type ethylene/propylene/diene copolymer rubber is from 50/50 to 90/10.

* * * * *